(12) United States Patent
Mace et al.

(10) Patent No.: US 6,557,770 B2
(45) Date of Patent: May 6, 2003

(54) THERMOSTATIC CARTRIDGE FOR MIXER TAPS

(75) Inventors: Christian Mace, Vert le Grand (FR); Jean Chamot, Arpajon (FR)

(73) Assignee: Vernet S.A., Arpajon Cedex (FR)

( * ) Notice: Subject to any disclaimer, the term of this patent is extended or adjusted under 35 U.S.C. 154(b) by 0 days.

(21) Appl. No.: 10/095,454

(22) Filed: Mar. 13, 2002

(65) Prior Publication Data

US 2002/0130189 A1 Sep. 19, 2002

(30) Foreign Application Priority Data

Mar. 15, 2001 (FR) .............................. 01 03557

(51) Int. Cl.$^7$ ...................... G05D 23/13; G05D 23/185
(52) U.S. Cl. .................... 236/12.1; 236/12.2; 236/100; 137/625.41
(58) Field of Search ................ 236/12.1, 12.2, 236/12.19, 12.17, 12.21; 137/625.41

(56) References Cited

U.S. PATENT DOCUMENTS

| | | | | |
|---|---|---|---|---|
| 4,181,252 A | * | 1/1980 | Nolden | 236/12.2 |
| 4,610,393 A | | 9/1986 | Rodriguez | |
| 5,356,074 A | * | 10/1994 | Limet et al. | 236/12.22 |
| 5,551,630 A | * | 9/1996 | Enoki et al. | 236/12.13 |
| 5,743,463 A | * | 4/1998 | Ueno et al. | 236/12.2 |
| 5,779,139 A | * | 7/1998 | Ueno | 236/12.2 |
| 5,806,761 A | * | 9/1998 | Enoki et al. | 236/12.2 |
| 6,085,984 A | * | 7/2000 | Chamot et al. | 236/12.2 |
| 6,089,462 A | | 7/2000 | Osvaldo | |
| 6,402,041 B2 | * | 6/2002 | Jelloul et al. | 236/12.2 |

FOREIGN PATENT DOCUMENTS

| | | |
|---|---|---|
| EP | 0 390 121 | 10/1990 |
| EP | 0 886 013 | 12/1998 |
| EP | 1 022 635 | 7/2000 |
| FR | 2 470 317 | 5/1981 |

\* cited by examiner

*Primary Examiner*—William E. Tapolcai
*Assistant Examiner*—Mohammad M. Ali
(74) *Attorney, Agent, or Firm*—Wenderoth, Lind & Ponack, L.L.P.

(57) ABSTRACT

To obtain an exact regulation of temperature, a strong flow, and a moderate cost, the cartridge comprises a first disc having two transverse hot fluid passages and two transverse cold fluid passages as well as a groove, the base of which forms a seat for a regulating valve which is joined to a thermostatic element, and a second disc having two passages for hot and cold fluid respectively, and which is coupled and rotatable relative to the first disc, between a communicating position and a non-communicating position of the two hot fluid passages on the one hand and the two cold fluid passages on the other of the first disc. The cartridge may be used for thermostatic water mixer taps, in particular for sinks, washbasins, showers and bathtubs.

8 Claims, 4 Drawing Sheets

THERMOSTATIC CARTRIDGE FOR MIXER TAPS

The invention relates to a quarter turn thermostatic cartridge with concentric controls, and ceramic discs as well as a mixer tap including such a cartridge.

Most quarter turn taps with ceramic disc cartridges which are currently used on sinks or washbasins, do not allow the temperature of the outlet fluid the "mixed" or "lukewarm" fluid to be efficiently stabilised, when the pressure and/or the temperature of one of the inlet fluids (the "cold fluid" and "hot fluid") varies.

Cartridges of this type, equipped with a thermostatic element to regulate the temperature of the outlet water, have, therefore, been created.

Mono control thermostatic cartridges of this type are well known, allowing for "mixer" taps, that is to say whereby the regulation of the flow and the temperature are carried out by the operation of a single lever. These cartridges ensure the regulation of the flow by means of two superimposed ceramic discs, the lower disc comprising channels for the rise and fall of the inlet cold fluid and hot fluid, and the regulation of the temperature of the mixed outlet water by means of a temperature regulating valve situated downstream, underneath the lower disc, joined to a thermostatic control element.

Thermostatic cartridges of this type with concentric controls are also known, requiring a tap comprising two concentric handles for the control of the flow and temperature. Flow regulation is also provided by two ceramic discs and temperature regulation by a temperature regulating valve joined to a thermostatic element, but the two discs comprise channels for the rise and fall of the cold fluid and of the hot fluid, and the valve, situated downstream from the channels, is arranged, this time, on top of the upper disc.

In both cases, the arrangement of the cartridge limits the diameter available for the temperature regulating valve and the section for the flow of fluid, resulting in poor temperature control, which is incompatible with current standards for thermostatic taps, and a weak flow, which limits the range of possible applications.

The aim of the invention is to overcome these drawbacks and, to this end, relates to a thermostatic cartridge with ceramic discs and concentric controls for a quarter turn fluid tap, comprising a regulating valve connected to a movable portion of a thermostatic element, and a first and second disc for regulating the flow, coupled on one of their faces, in which the first disc has two internal transverse hot fluid passages extending approximately in circumferential arcs of approximately equal radiuses, separate and approximately end to end, two internal transverse cold fluid passages extending approximately in circumferential arcs of approximately equal radiuses, separate and approximately end to end, and an internal groove opening onto the face of the disc which is not coupled to the second disc and the base of which forms a seat for the valve and is in communication with one of the cold fluid passages, and the second disc has two internal transverse passages of hot fluid and cold fluid respectively, extending approximately in circumferential arcs and rotatable relative to the first disc between an open position, in which the hot fluid passage of the second disc links the hot fluid passages of the first disc, and the cold fluid passage of the second disc links the cold fluid passages of the first disc, and a closed position when the hot fluid passage of the second disc is isolated from at least one of the hot fluid passages of the first disc and the cold fluid passage of the second disc is isolated from at least one of the cold fluid passages of the first disc, and vice versa.

Thanks to this arrangement, efficient temperature regulation is achieved in a large range of flows, and particularly for very strong flows.

In addition, the cartridge may also have one or more of the following further characteristics:

the respective hot fluid and cold fluid passages of the second disc are transverse passages, and the cartridge includes a flow control lever provided with two chambers for hot fluid and cold fluid respectively, opposite the respective hot fluid and cold fluid passages of the second disc; thus, the hot and cold fluid flow sections between the respective hot fluid and cold fluid passages may be large while not requiring a large thickness for the second disc.

the respective hot fluid and cold fluid passages of the second disc do not cross this disc from one side to the other; in this case the manufacture of the second disc and of the control handle is simplified, as is the assembly of the cartridge.

it includes an annular space for hot fluid, extending around the valve and defined by the exterior surfaces of the valve and the internal surfaces of a device comprising a valve seat and/or a casing in which the valve and the discs are housed; this provides for distribution of the hot fluid around the valve, which contributes to stable regulation.

it includes an annular space for cold fluid, extending around the valve and defined by the exterior surfaces of the valve and the internal surfaces of a device comprising a valve seat; this provides for distribution of the cold fluid around the valve, which also contributes to stable regulation.

it comprises a casing having an integral hot fluid inlet pipe and a cold fluid inlet pipe communicating respectively with a hot fluid passage and a cold fluid passage of the first disc which is rotatable with the said casing, a hot fluid return pipe into which runs a hot fluid return passage of the first disc, a surface forming a seat for the valve and defining with the valve a passage for the hot fluid coming from the first disc through the hot fluid return pipe to direct it towards the interior of the valve, and an internal guiding surface of the valve, and the casing contains the two discs as well as the regulating valve and the thermostatic element, supported by a casing plug; thus the manufacturing costs of the cartridge remain relatively low; and it comprises a device for creating agitation, having an irregularly shaped internal surface, opposite a thermosensitive area of a thermostatic element; thus thermostatic regulation is improved.

The invention also relates to a mixer tap provided with a cartridge as described above, and including a flow control device connected to a flow control lever of the cartridge, and a temperature control device connected to a temperature control lever of the cartridge.

Other characteristics and advantages of the invention will become apparent in the following description, as will embodiments of the invention given by way of example, and illustrated in the accompanying drawings, in which.

Figure 1:
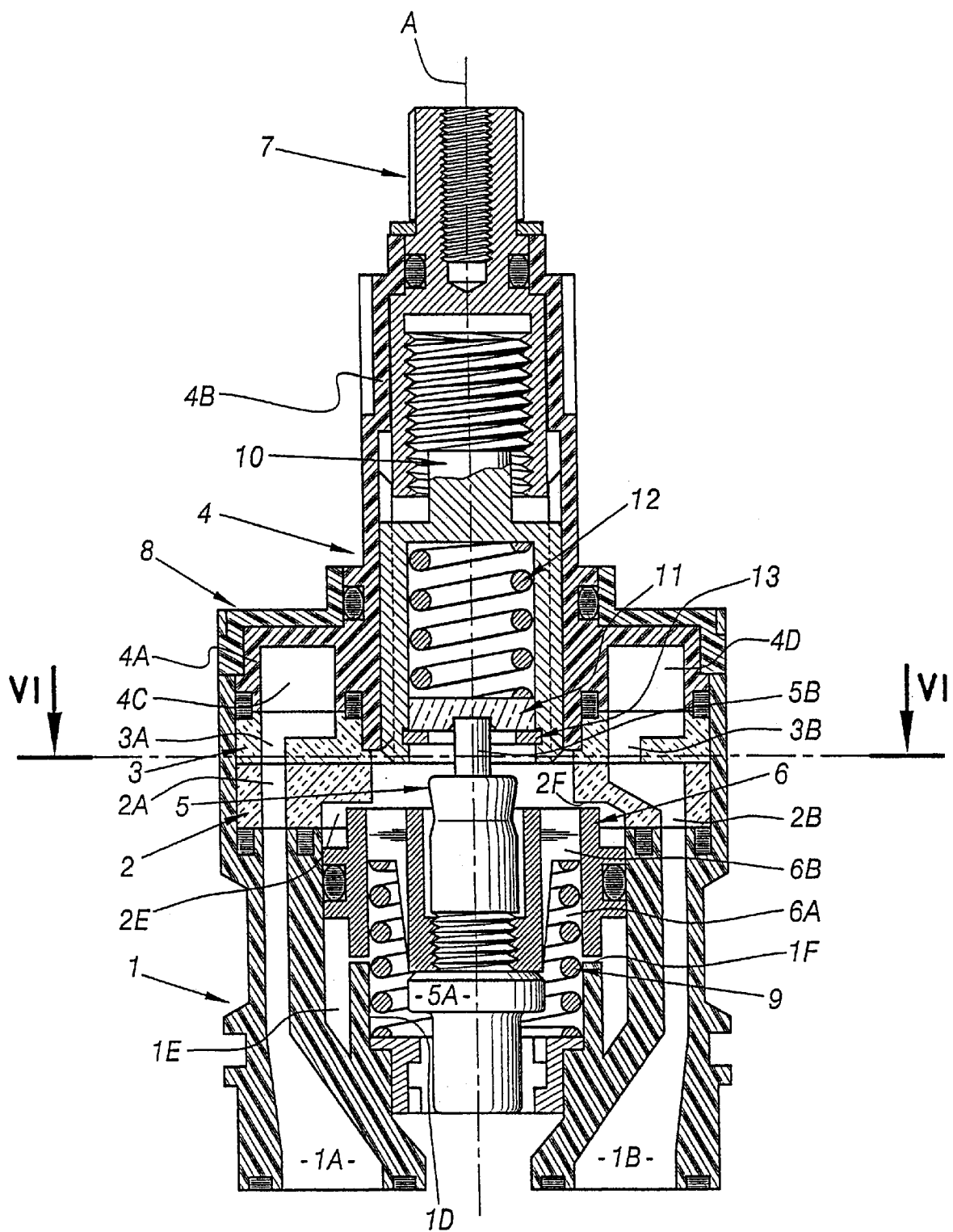
FIG. 1 is a schematic longitudinal cross-section of a thermostatic cartridge according to the invention.

The cartridge represented in the drawings, arranged around and along a central axis A is intended for use in a water mixer tap.

Figure 2:
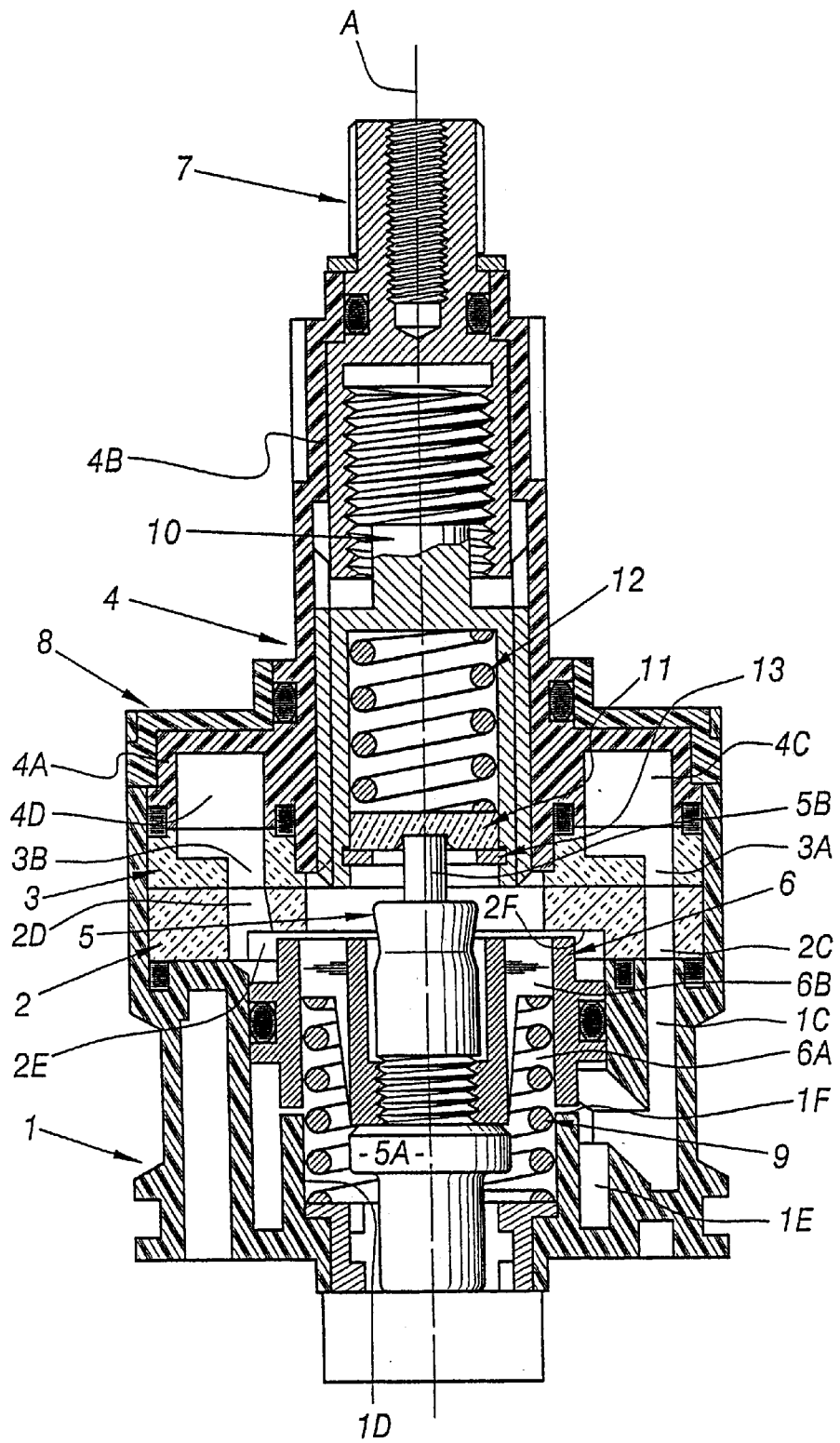
FIG. 2 is a schematic longitudinal cross-section of the cartridge of FIG. 1, in a plane perpendicular to that of FIG. 1.
Figure 3:
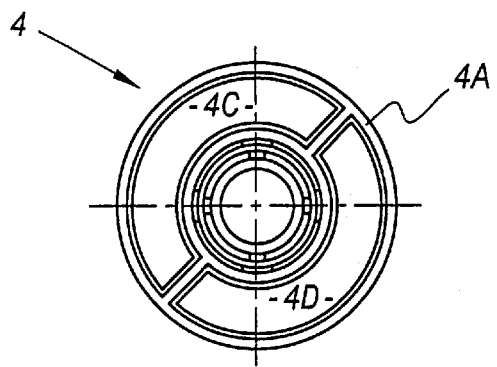
FIG. 3 is a view from below of a flow control lever provided in the cartridge of FIGS. 1 and 2.
Figure 4:
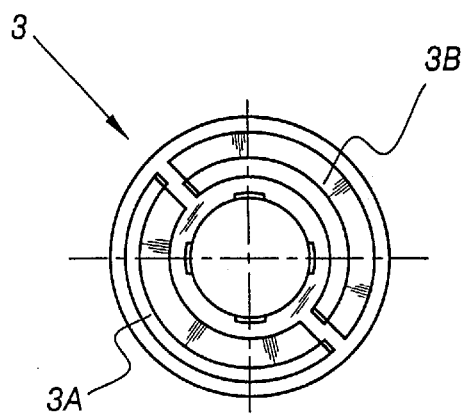
FIG. 4 is a plan view of an upper disc provided in the cartridge of FIGS. 1 and 2.
Figure 5:
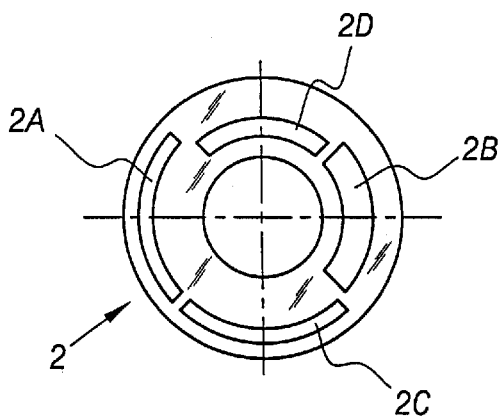
FIG. 5 is a plan view of a lower disc provided in the cartridge of FIGS. 1 and 2.
Figure 6:
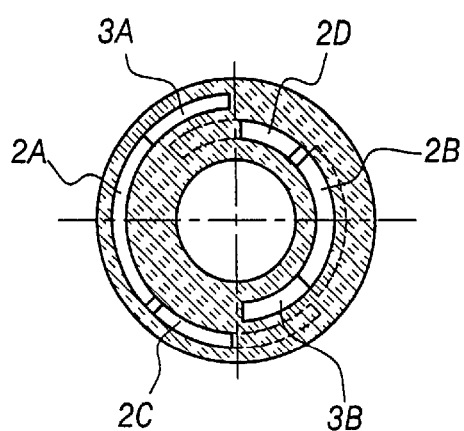
FIG. 6 is a cross-section view along a plane, transverse to the cartridge along the line VI—VI of FIG. 1, of the assembly of the upper disc of FIG. 4 onto the lower disc of FIG. 5.

The cartridge comprises a casing 1 having in its base (its lower portion in FIGS. 1 and 2), extending longitudinally, an offset hot water flow inlet pipe 1A, an offset cold water flow inlet pipe 1B, an offset hot water return pipe 1C, and a central flow channel (axial) terminating in the area of the lower end of the base of the casing, through an outlet pipe of mixed water 1D. The casing 1 has, in its upper portion of a generally cylindrical exterior shape, a housing also of general cylindrical shape in which are housed a lower disc 2, an upper disc 3, whose lower face is coupled to the upper face of the lower disc 2, and the lower portion 4A of a flow control lever 4 adapted to be connected to a flow control device of a mixer tap. The lower portion 4A of the lever comprises an exterior flange, the base of which is threaded onto the upper portion of the casing 1 and is supported on the upper disc 3, and an internal sleeve projecting beyond the flange and which is threaded onto the upper portion of a central flow hole (axial) of the upper disc 3 which is connected for rotation with the lever. The lower portion 4A contains a device for an overtravel stop which will be described later, for a movable armature comprising a thermostatic element 5 of expandable wax comprising a movable portion 5A, one part of which is thermo-sensitive, to which is joined, for example screwed, a regulating valve 6. The movable armature is essentially housed in the axial holes of the casing and of the discs as will be seen in due course; in the upper portion 4B of the lever 4, is housed the base of a temperature control lever 7, to which the movable armature is linked by a screw-nut system and which is adapted to be connected to a temperature control device of the tap.

More precisely, in the base of the casing 1, the central channel terminating through the mixed water outlet pipe 1D has, in its upper portion, a chamber with a larger diameter than the pipe 1D, in which the valve 6 is slidably mounted. The chamber extends around the pipe 1D through an annular groove 1E internally defined and separated from the pipe by an annular internal partition of which an outer edge 1F forms a seat for the valve 6. The hot water return pipe 1C opens into the annular groove and it is thus in communication with the central channel and with the mixed water outlet pipe 1D when the valve is not in engagement with its seat 1F; it will be noted that the hot water return pipe 1C does not go into the lower face of the base of the casing, but only goes into the upper face, and as has just been seen, into the groove 1E.

The lower disc 2, connected for rotation with the casing 1, has a central axial hole crossing the disc from one side to the other. It also has, in relation to the hot water inlet pipe 1A, a first internal hot water passage 2A also crossing and extending in the disc in a circumferential arc centred on the central axis A and less than 90°, and secondly with regard to the cold water inlet pipe 1B a first internal cold water passage 2B also crossing and extending in a circumferential arc centred on the central axis and less than 90°, diametrically opposed to the first hot water passage 2A. The lower disc 2 has a second internal hot water passage 2C crossing the disc from one side to the other, extending (in a circumferential arc centred on the central axis and less than 90°, which is not connected to the hot water inlet pipe 1A, but which instead opens onto the hot water return pipe 1C, and a second internal cold water passage 2D, crossing and extending in a circumferential arc centred on the central axis and less than 90°, which is not connected to the cold water inlet pipe 1B, but which instead opens onto a groove 2E of the disc extending annularly about the central hole and opening onto the face of the disc which is coupled to the upper face of the base of the casing 1. In the chamber of the central channel of this base; the annular head 2F of the groove 2E, opposite the seat 1F of the casing 1 for a lower face of the valve 6, itself constitutes a seat for the opposite, upper face of the valve. The radiuses of the circumferential arcs of the two hot water transverse passages 2A, 2C, are approximately equal, and these two passages are arranged approximately end to end and not very far apart. In the face of the disc which is opposite the base of the casing 1, the first cold water flow passage 2B opens out in a circumferential arc of a radius which is approximately equal to that of the hot water passages 2A, 2C while in the opposite face coupled to the upper disc 3, the second cold water flow passage 2D opens out in a circumferential arc of a smaller radius in such a way that, in this opposite face, the exterior wall of the orifice of the second cold water passage 2D is closer to the axis A than the interior wall of the orifices of the two hot water passages 2A, 2C. On the other hand, the first cold water passage 2B opens out in the direction of the said opposite face in such a way that in the latter the two orifices of the cold water passages 2B, 2D are the same distance away from the axis A. The four passages 2A, 2B, 2C, 2D each extend over just less than a quarter of the circumference. A seal is inserted in the hollow grooves opposite the casing 1 and the disc 2.

The upper disc 3 also has a central hole crossing it from one side to the other and, in addition, a hot water flow passage 3A and a cold water flow passage 3B extending in circumferential arcs about the central hole. In the face of the upper disc 3 which is coupled to one face of the lower disc 2, the hot water passage 3A and the cold water passage 3B open out in orifices of the same radiuses respectively as those of the orifices opposite the hot water passages 2A, 2C and of the second cold water passage 2D of the lower disc. The two passages 3A, 3B of the upper disc 3 each extend over just less than half a circumference; they have an enlarged portion, seen here as a sloping section, from the side of the face of the upper disc which is coupled to the flange of the flow control lever 4, in such a way as to open onto this face through a larger orifice than in the face coupled to the lower disc.

The lower portion 4A of the flow control lever 4 connected for rotation with the upper disc 3 comprises, as already seen, a sleeve which is threaded onto the upper portion of the central flow hole of the upper disc 3. This sleeve abuts against a shoulder of the central hole. A seal is inserted in the hollow grooves opposite in the coupled faces of the upper disc 3 and of the lever. As already seen, the lower portion 4A of the arm comprises a flange whose base is threaded into the upper portion of the casing 1; the flange, at the opposite end of its base, projects out of the casing 1. Around the projecting area of the flange, stop 8 is fitted for the casing, to which the flange and therefore the lever are axially connected. On the inside of the flange, a hot water chamber 4C and a cold water chamber 4D in communication with the respective hot water passages 3A and cold water passages 3B of the upper disc 3, extend in circumferential arcs along the same length and breadth as the latter. As already seen, the lever 4 is intended to be connected to a flow control device of a mixer tap, and, to this end, an exterior area of its upper portion 4B is fluted or grooved longitudinally.

The regulating valve 6 is, as already seen, slidably mounted to the interior of a chamber of the central channel of the base of the casing 1, in which it is guided by the lateral interior surface of the latter by means of an O-ring seal. It is adapted so as to selectively urge one of its faces against the seat 1F which comprises an end edge of an internal annular partition of the base of the casing, or its opposite face against the seat 2F which comprises the annular head of the groove 2E of the lower disc 2. Internally the valve 6 has an annular chamber 6A, opening onto its face which is opposite the seat IF, and in which a return spring 9 is housed. It also has cold water passage holes 6B to allow the flow of cold water longitudinally across the valve, opening on one side onto the face of the valve adjacent the seat 2F of the lower disc 2 and of the opposite side in the chamber 6A.

A temperature regulating screw 10 is housed inside the flow control lever 4, to which it is rotatably connected. The regulating screw 10 is threadedly connected to the temperature control lever 7 in such a way as to constitute a movement transmission system of the screw-nut type. The screw 10 has an interior chamber which houses an overtravel support 11 in the form of a disc for a normally fixed part 5B of the thermostatic element 5 (that is, fixed in the absence of overtravel of the element 5 due to a very high temperature), an overtravel spring 12, and a split resilient lock washer 13 of which a peripheral part is housed in an annular groove of the interior surface of the chamber, in proximity to the end of the latter which is open towards the valve 6. The normally fixed part 5B of the thermostatic element (here the interior part of the element 5) is urged against the head of a blind recess in the overtravel support 11, and, in the absence of overtravel, the overtravel spring 12 urges the overtravel support 11 against the lock washer 13.

The base of the temperature control lever 7, axially housed and immobilised by means of a split washer in the upper part of the flow control lever 4, is freely rotatable in the latter and the seal between the two levers is provided by an O-ring.

An annular device for creating agitation 14, the so-called "agitator", inserted in the central mixed water outlet pipe 1D around the thermosensitive area of the movable part 5A of the thermosensitive element 5, has an irregularly shaped interior surface opposite and at some distance from this area to ensure an even temperature of the outlet flow from the cartridge between the agitator 14 and the element 5, and to encourage the heat exchange between the mixed water and the thermosensitive area of the thermostatic element; this annular device 14 is urged into engagement with a shoulder of the pipe ID by means of a return spring 9.

The stop 8 ensures cohesion between all these parts of the cartridge and particularly allows the base of the casing 1 and the discs 2, 3 to be urged into engagement by means of the flow control lever 4 around which it is encased by an O-ring.

The cartridge works as follows

The hot water enters the cartridge through the pipe 1A of the casing 1, rises through the first hot water passage 2A of the lower disc 2, circulates in the hot water passage 3A of the upper disc 3 and in the hot water chamber 4C of the flow control lever 4, falls through the second hot water passage 2C of the lower disc then through the hot water return pipe 1C of the casing, enters the annular groove 1E of the casing and above the latter around the lower portion of the regulating valve 6, and reaches the base of the chamber 6A of the valve if the latter is not in engagement with its lower seat 1F. Simultaneously, the cold water enters the cartridge through the pipe 1B of the casing 1, rises through the cold water passage 2B of the lower disc, circulates in the cold water passage 3B of the upper disc and in the cold water chamber 4D of the flow control lever 4, falls through the second cold water passage 2D of the lower disc, enters in the annular groove 2E of the lower disc 2 and below the latter around the upper part of the regulating valve 6, and reaches the head of the chamber 6A of the valve, passing between the latter and its upper seat 2F and through the passage holes 2B if the valve is not in engagement with its seat.

At the base of the valve 6, the hot water and the cold water begin to mix, and the mixing continues around the thermostatic element 5 and particularly in its thermosensitive area and inside the agitator 14 inserted in the mixed water outlet pipe 1D through which the mixed water is drained off.

Flow control is achieved by the flow control lever 4 being rotated, causing the upper disc 3 to rotate, defining the angular position of this disc in relation to the lower disc 2, and thereby the flow section for the hot water resulting from the more or less extensive overlapping of the passage 3A of the upper disc and of the second passage 2C of the lower disc, and the flow section for the cold water resulting from the more or less extensive overlapping of the passage 3B of the upper disc and of the second passage 2D of the lower disc. The shape of the passages is adapted so that the hot water and cold water flow sections are the same whatever the relative angular position is between the two discs. The flow sections vary from total closure to maximum opening, and vice versa.

When the temperature of the mixed water increases, the thermostatic element 5 extends, the regulating valve 6 which is connected to it reduces the space which separates it from its seat 1F in the base of the casing 1 and increases that which separates it from its seat 2F in the lower disc 2. This reduces the hot water flow section and increases the cold water flow section, and results in a decrease in temperature of the mixed water; it works in the opposite way when the mixed water temperature decreases. The temperature adjustments of the mixed water by the thermostatic element balance each other until this temperature is stabilised at a level which depends upon the position reached by the piston (the normally fixed part) of the thermostatic element 5.

Temperature control is achieved by the temperature control lever 7 being rotated and which, by the screw-nut system, causes a translation movement of the temperature regulating screw 10 which engages the overtravel support 11 (as long as the regulating valve 6 does not abut against the upper disc 3) against which the piston of the thermostatic element 5 abuts. A thrust bearing device inside the cartridge (the thrust of the temperature regulating screw 10 on the temperature control lever 7) or outside (a wheel arranged on the lever 7) limits the temperature control to an appropriate level (for example 50° C. or 55° C. maximum at the point of "drawing"). In addition, if the cold water is suddenly cut off, the thermostatic element 5 is only acted on by the hot water, and the piston greatly extends. The regulating valve 6 to which it is connected moves until it comes into contact with its seat 1F in the casing 1, and the overtravel support 11 moves away from the lock washer 13, compressing the overtravel spring 12. The hot water is then automatically shut off, thus avoiding any risk of scalding, which gives the cartridge an anti-scalding safety feature.

Of course, the invention is not limited to the embodiment described above, and others may be provided, within the scope of the claims.

Figure 7:
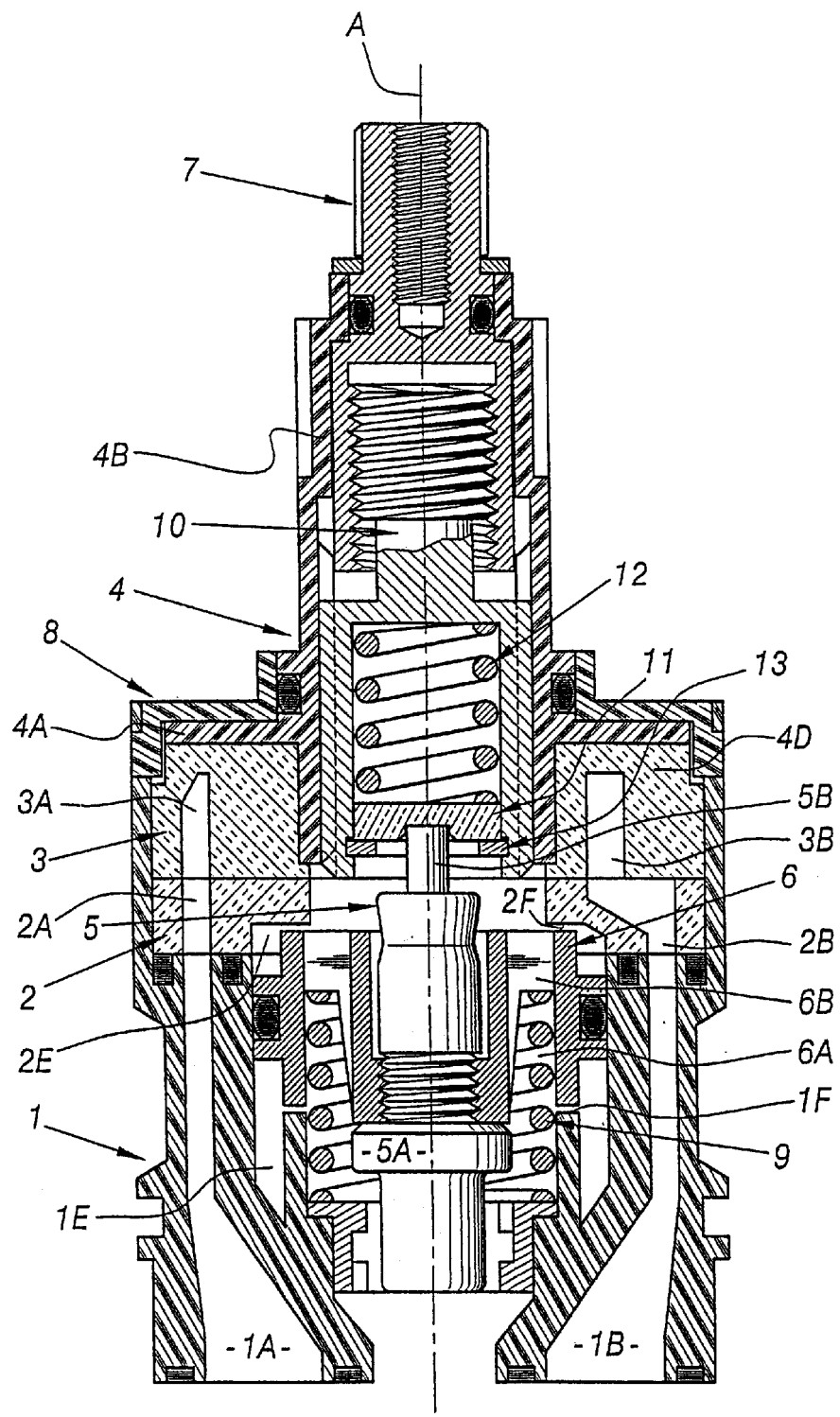
FIG. 7 is a schematic longitudinal cross-section similar to that of FIG. 1, of a second use of a cartridge according to the invention.

For example, the embodiment in FIG. 7 is a modification of the embodiment of FIGS. 1 to 6, and the elements which are identical or very similar to those in the embodiment of the preceding figures have been marked by the same numerical references and the identical elements will not be described again.

The cartridge in FIG. 7 has an upper disc 3 in which the hot water passage 3A and the cold water passage 3B do not cross from one side to the other and a flow control lever 4 where the flange of the lower portion 4A, contrary to the preceding case, does not include a hot water chamber nor a cold water chamber. It may even be reduced, therefore, to a simple disc coupled to the upper face of the lower disc 2. The operation is identical to that of the first embodiment, except that the hot water and the cold water only circulate in the passages 3A, 3B of the upper disc 3 before falling across the lower disc 2. This results in the easier manufacturing of parts and easier assembly than is the case for the first embodiment.

What is claimed is:

1. A thermostatic cartridge with ceramic discs for a fluid tap, of the quarter turn type with concentric controls, comprising a regulating valve joined to a movable portion of a thermostatic element and first and second flow control discs coupled on one of their faces, wherein said first disc has two internal transverse hot fluid passages, extending approximately in circumferential arcs of approximately equal radiuses, separate and approximately end to end, two internal transverse cold fluid passages, extending approximately in circumferential arcs of approximately equal radiuses, separate and approximately end to end, and an internal groove opening onto said face of said disc which is not coupled to said second disc and the base of which forms a seat for said regulating valve and is in communication with one of said cold fluid passages, and said second disc has two internal transverse passages for hot fluid and cold fluid respectively, extending approximately in circumferential arcs, said second disc being rotatable relative to said first disc between an open position, in which said hot fluid passage of said second disc links said hot fluid passages of said first disc and said cold fluid passage of said second disc links said cold fluid passages of said first disc, and a closed position, in which said hot fluid passage of said second disc is isolated from at least one of said hot fluid passages of said first disc and said cold fluid passage of said second disc is isolated from at least one of said cold fluid passages of said first disc.

2. A thermostatic cartridge according to claim 1, wherein said respective hot fluid and cold fluid passages of said second disc are transverse passages, and said cartridge includes a flow control lever with two chambers for hot fluid and cold fluid respectively opposite said respective hot fluid and cold fluid passages of said second disc.

3. A thermostatic cartridge according to claim 1, wherein said respective hot fluid and cold fluid passages of said second disc do not extend across this disc from one side to the other.

4. A thermostatic cartridge according to claim 1, including an annular space for hot fluid extending around said regulating valve, said hot fluid space being defined by exterior surfaces of said valve and interior surfaces of a device comprising a valve seat and/or of a casing in which said regulating valve and said first and second discs are housed.

5. A thermostatic cartridge according to claim 1, including an annular space for cold fluid extending around said regulating valve, said cold fluid space being defined by exterior surfaces of said valve and interior surfaces of a device comprising a valve seat.

6. A thermostatic cartridge according to claim 1, including a casing having an integral hot fluid inlet pipe and a cold fluid inlet pipe communicating respectively with a said hot fluid passage and a said cold fluid passage of said first disc, said first disc being rotatable with said casing, a hot water return pipe opening into which is a hot fluid passage of said first disc, a surface forming a seat for said regulating valve, said seat surface and said valve defining a passage for hot fluid coming from said first disc through the hot water return pipe to direct it towards the interior of said valve, and an interior guiding surface of the valve, and said casing contains said first and second discs, said regulating valve and said thermostatic element supported by a stop of said casing.

7. A thermostatic cartridge according to claim 1, including a device for creating agitation, said device having an irregularly shaped interior surface opposite a thermosensitive area of said thermostatic element.

8. A mixer tap provided with a thermostatic cartridge according to claim 1, and comprising a flow control device connected to a flow control lever of said cartridge, and a temperature control device connected to a temperature control lever of said cartridge.

* * * * *